United States Patent
Ahmed et al.

(10) Patent No.: US 11,804,605 B1
(45) Date of Patent: Oct. 31, 2023

(54) METAL OXIDE NANOCOMPOSITES FOR ELECTROCHEMICAL OXIDATION OF UREA

(71) Applicant: KING FAISAL UNIVERSITY, Al-Ahsa (SA)

(72) Inventors: Hany Mohamed Abd El-Lateef Ahmed, Al-Ahsa (SA); Mohammed Gouda, Al-Ahsa (SA); Mai Mustafa Khalaf Ali, Al-Ahsa (SA); Fatimah Abdrabalameer Salman, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/111,832

(22) Filed: Feb. 20, 2023

(51) Int. Cl.
| | |
|---|---|
| H01M 4/00 | (2006.01) |
| H01M 4/86 | (2006.01) |
| H01M 4/96 | (2006.01) |
| H01M 4/90 | (2006.01) |

(52) U.S. Cl.
CPC ....... H01M 4/8652 (2013.01); H01M 4/9008 (2013.01); H01M 4/9016 (2013.01); H01M 4/96 (2013.01)

(58) Field of Classification Search
None
See application file for complete search history.

(56) References Cited

U.S. PATENT DOCUMENTS

| | | | |
|---|---|---|---|
| 2003/0196789 A1 | 10/2003 | Wellington et al. | |
| 2003/0219371 A1 | 11/2003 | Amendola | |
| 2006/0036474 A9 * | 2/2006 | Brugger | G06Q 10/025 705/5 |
| 2012/0156582 A1 | 6/2012 | Tao et al. | |
| 2021/0083275 A1 * | 3/2021 | Iwaya | H01M 4/0404 |

FOREIGN PATENT DOCUMENTS

| | | | | |
|---|---|---|---|---|
| CN | 109126760 A | * | 1/2019 | ............ B01J 23/10 |
| CN | 111841567 A | | 10/2020 | |

OTHER PUBLICATIONS

CN-109126760-A, English translation (Year: 2019).*
Kumar et al, A Facile synthesis of the Nickel Oxide Nanoparticles for the Effective Electrochemical Detection of Hydrogen peroxide in Contact Lens Solution, Int. J. Electrochem. sci. 15, pp. 8181-8189 (Year: 2020).*
Albokheet et al., removal of methylene blue dye using nickel oxide/carboxymethyl cellulose nanocomposite: kinetic, equilibrium and thermodynamic studies, journal of textile science and fashion technology, (Year: 2021).*
Yadav et al., Synthesis and characterization of nickel oxide/ cobalt oxide nanocomposite for effective degradation of methylene blue and their comparative electrochemical study as electrode, international journal of hydrogen energy. 47, pp. 41684-41697 (Year: 2022).*
Kamal, Bacterial cellulose as support for biopolymer stabilized catalytic cobalt nanoparticles, International Journal of Biological macromolecules, vol. 135, Aug. 2019, pp. 1162-1170 (Year: 2019).*
Khalaf et al., "Electrocatalytic performance of inorganic nanoflakes nickel phosphates under adjusted synthetic parameters towards urea and methanol oxidation in alkaline media," Microchemical Journal, vol. 163, Apr. 2021, 105901.
El Lateef et al., "Facile synthesis of Co/Ni bimetallic phosphate as electrode material for urea fuel cells: Effect of synthetic strategy on the physicochemical and electrocatalytic behavior," Fuel, vol. 334, Part 1, Feb. 15, 2023, 126671.
Tesfaye et al., "Ni—Co bimetal decorated carbon nanotube aerogel as an efficient anode catalyst in urea fuel cells," Scientific Reports vol. 9, Article No. 479 (2019).
Xu et al., "Nickel-cobalt bimetallic anode catalysts for direct urea fuel cell," Scientific Reports vol. 4, Article No. 5863 (2014).
Tien et al., "Metal-Organic Framework-Derived Ni-Co@C Catalysts for Urea Oxidation in Urea/H,O, Fuel Cells," J Nanosci Nanotechnol., Mar. 1, 2021;21(3):1890-1896.

* cited by examiner

*Primary Examiner* — Stefanie J Cohen
(74) *Attorney, Agent, or Firm* — Nath, Goldberg & Meyer; Richard C. Litman

(57) ABSTRACT

A metal oxide nanocomposite including metal oxide nanoparticles distributed over a carboxymethyl cellulose (CMC) shell. The metal oxide nanoparticles include at least one metal oxide nanoparticle selected from nickel oxide nanoparticles and cobalt oxide nanoparticles. A working electrode can be modified with the metal oxide nanocomposite to provide a nanohybrid electrode. The nanohybrid electrode can be effectively used in urea fuel cells (UFCs) to achieve electrochemical oxidation of urea.

7 Claims, 5 Drawing Sheets

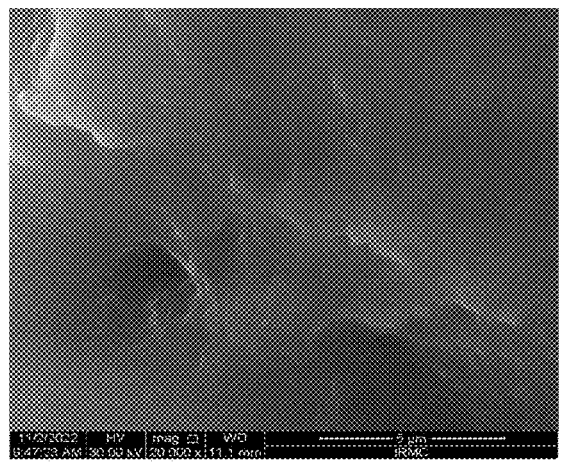
FIG. 2A
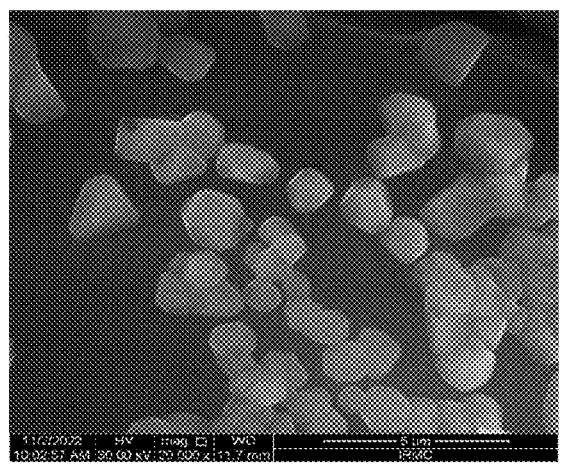
FIG. 2B
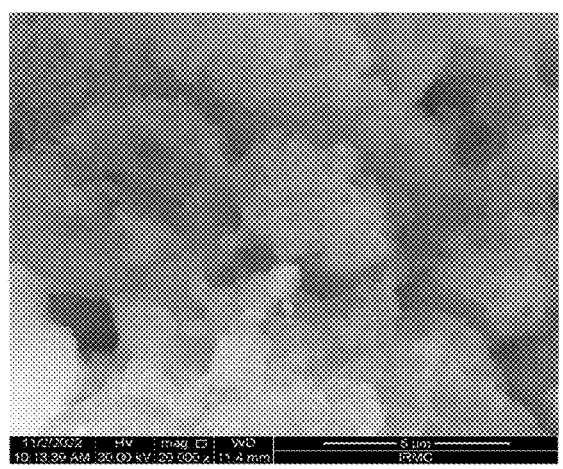
FIB. 2C

METAL OXIDE NANOCOMPOSITES FOR ELECTROCHEMICAL OXIDATION OF UREA

BACKGROUND

1. Field

The disclosure of the present patent application relates to metal oxide nanocomposites, and particularly, to metal oxide nanocomposites including non-precious metal oxide nanoparticles distributed over a carboxymethyl cellulose (CMC) core.

2. Description of the Related Art

A fuel cell is an electrochemical apparatus that generates electricity from fuel and oxidant supplied to it. In a fuel cell, the fuel is consumed, and electrons are generated on the anode side. The electrons generated are forced through an external circuit to the cathode, where they react with the oxidant, typically oxygen present in air. The anode and cathode are separated by an electrolyte but are connected by an external circuit through which the electrons generated flow from anode to cathode, thereby allowing electrical power to be harnessed.

During the industrial synthesis of urea, a large amount of waste water with varying urea concentrations is formed. A large amount of human or animal urine, containing about 2-2.5 wt. % urea, is produced every day. There is a significant level of urea in municipal wastewater, but the available denitrification technologies are expensive and inefficient. It has been reported that hydrogen can be generated from urine or urea-rich wastewater through electrolysis. However, it would be more efficient to generate electricity directly from urine or urea-rich wastewater.

Utilization of wastewater containing urea/urine as fuel in urea fuel cells (UFCs), has proven to be an environmentally friendly energy generation technology and holds great potential in fulfilling rising energy demand. Use of an effective anode catalyst plays a significant role in increasing the electrochemical oxidation performance of urea and further boosting the performances of UFC.

Thus, a metal oxide nanocomposite that can enhance the electrochemical oxidation performance of an electrode in urea fuel cells (UFCs) solving the aforementioned problems is desired.

SUMMARY

The present subject matter relates to a metal oxide nanocomposite comprising metal oxide nanoparticles distributed over a carboxymethyl cellulose (CMC) shell. In one embodiment, the metal oxide nanoparticles include at least one metal oxide nanoparticle selected from nickel oxide nanoparticles and cobalt oxide nanoparticles. In an embodiment, the metal oxide nanoparticles comprise nickel oxide nanoparticles and cobalt oxide nanoparticles. According to an embodiment, a working electrode can be modified with the metal oxide nanocomposite to provide a nanohybrid electrode. The nanohybrid electrode can be effectively used in urea fuel cells (UFCs) to achieve electrochemical oxidation of urea.

An embodiment of the present teachings relates to a nanohybrid electrode including a working electrode modified with at least one metal oxide nanocomposite comprising metal oxide nanoparticles distributed over a carboxymethyl cellulose shell. In an embodiment, the at least one metal oxide nanocomposite is selected from a nickel oxide nanocomposite, a cobalt oxide nanocomposite, and a nickel oxide and cobalt oxide nanocomposite. In an embodiment, the working electrode includes a glassy carbon electrode (GCE).

These and other features of the present subject matter will become readily apparent upon further review of the following specification and drawings.

BRIEF DESCRIPTION OF THE DRAWINGS

FIGS. 2A-2C are emission scanning electron microscopy (SEM) images of FIG. (2A) Ni@CMC; (FIG. 2B) Co@CMC; and (FIG. 2C) Ni/Co@CMC (5 μm magnification).

(FIG. 3B) Co@CMC; and (FIG. 3C) Ni/Co@CMC (100 μm magnification).

Similar reference characters denote corresponding features consistently throughout the attached drawings.

DETAILED DESCRIPTION OF THE PREFERRED EMBODIMENTS

Figure 1:
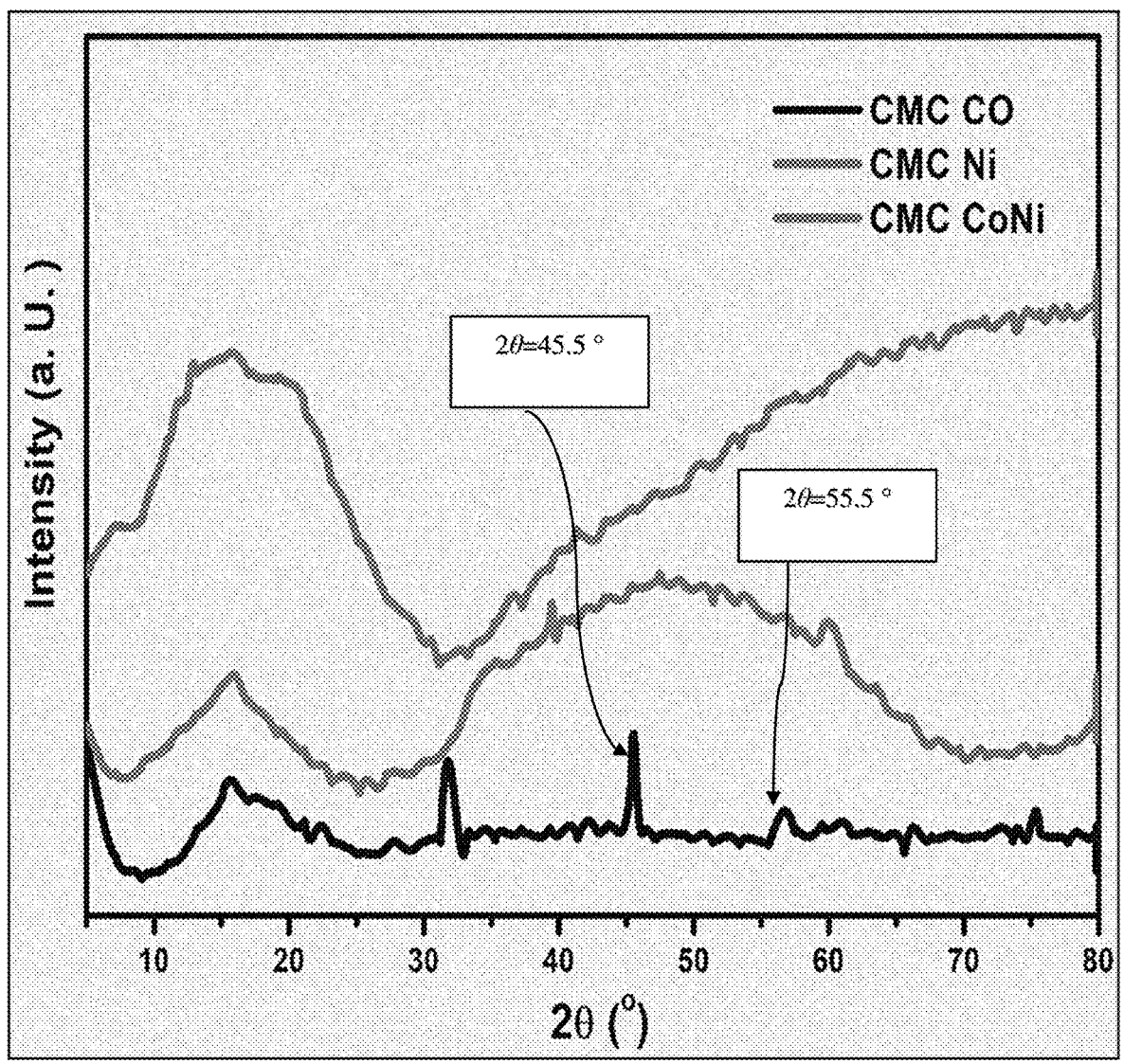
FIG. 1 shows X-ray diffraction (XRD) patterns for Co@CMC, Ni@CMC, and Co/Ni@ CMC.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

In one embodiment, the present subject matter relates to a metal oxide nanocomposite including non-precious metal oxide nanoparticles distributed over a carboxymethyl cellulose (CMC) core or shell. In other words, the present metal oxide nanocomposites have a core-shell structure, with the CMC comprising the core shell. In an embodiment, the metal oxide nanocomposite is selected from a nickel oxide nanocomposite (herein, Ni@CMC), a cobalt oxide nanocomposite, (herein, Co@CMC), and a nickel oxide and cobalt oxide nanocomposite (herein, Ni/Co@CMC). According to an embodiment, a working electrode for use in urea fuel cells (UFC) can be modified with the metal oxide nanocomposite to achieve enhanced electrochemical oxidation of urea.

An embodiment of the present teachings relates to a nanohybrid electrode including a working electrode modified with at least one metal oxide nanocomposite selected from a nickel oxide nanocomposite, a cobalt oxide nanocomposite, and a nickel oxide and cobalt oxide nanocomposite. In an embodiment, the working electrode comprises a glassy carbon electrode (GCE). In a further embodiment, the nickel oxide and cobalt oxide nanoparticles can be embedded with the carboxymethyl cellulose core-shell structure to enhance the distribution of the nanoparticle across the core-shell. Furthermore, the assembly of the CMC polymeric matrix with $NiO/Co_2O_3$ nanoparticles throughout the synthetic pathways can improve structural flaws, electrocatalysis, and charge transfer, resulting in superior electrochemical activity.

In an embodiment, the carboxymethyl cellulose shell can have an average particle size ranging from about 15 nm to about 20 nm, for example about 18 nm. Also contemplated are carboxymethyl cellulose shells having an average particle size of about 15 nm, about 16 nm, about 17 nm, about 18 nm, about 19 nm, about 20 nm, or any range of any two endpoints thereof. The nickel oxide nanocomposite can include nickel oxide nanoparticles distributed on the carboxymethyl cellulose shell. In an embodiment, the nickel oxide nanoparticles can be generally granular, having an average size ranging from about 50 nm to about 60 nm, for example about 55 nm. Also contemplated are nickel oxide nanoparticles having an average size of about 50 nm, about 51 nm, about 52 nm, about 53 nm, about 54 nm, about 55 nm, about 56 nm, about 57 nm, about 58 nm, about 59 nm, about 60 nm, or any range of any two endpoints thereof. The cobalt oxide nanocomposite can include cobalt oxide nanoparticles distributed on the carboxymethyl cellulose shell. In an embodiment, the cobalt oxide can be generally cubic, having an average diameter ranging from about 55 nm to about 65 nm, e.g., about 60 nm, and an average length ranging from about 150 nm to about 170 nm. Also contemplated are cobalt oxide nanoparticles having an average diameter of about 55 nm, about 56 nm, about 57 nm, about 58 nm, about 59 nm, about 60 nm, about 61 nm, about 62 nm, about 63 nm, about 64 nm, about 65 nm, or any range of any two endpoints thereof. Similarly contemplated are cobalt oxide nanoparticles having an average length of about 150 nm, about 151 nm, about 152 nm, about 153 nm, about 154 nm, about 155 nm, about 156 nm, about 157 nm, about 158 nm, about 159 nm, about 160 nm, about 161 nm, about 162 nm, about 163 nm, about 164 nm, about 165 nm, about 166 nm, about 167 nm, about 168 nm, about 179 nm, about 170 nm, or any range of any two endpoints thereof. The nickel oxide and cobalt oxide nanocomposite can include both nickel oxide nanoparticles and cobalt oxide nanoparticles distributed on the carboxymethyl cellulose shell.

In an embodiment, a method of operating a urea fuel cell (UFC) can include providing the nanohybrid electrode in the fuel cell and contacting the nanohybrid electrode with urea. The nanohybrid electrode can be an efficient catalyst for urea oxidation. In an embodiment, a current density ranging from about 240 $mA/cm^2$ to about 365 $mA/cm^2$ can be achieved in the presence of 1.5 M of urea. In an embodiment, a current density of 363.1 $mA/cm^2$ can be achieved in the presence of 1.5 M of urea. Further contemplated are the achievement of current densities of 240 $mA/cm^2$, 245 $mA/cm^2$, 250 $mA/cm^2$, 255 $mA/cm^2$, 260 $mA/cm^2$, 265 $mA/cm^2$, 270 $mA/cm^2$, 275 $mA/cm^2$, 280 $mA/cm^2$, 285 $mA/cm^2$, 290 $mA/cm^2$, 295 $mA/cm^2$, 300 $mA/cm^2$, 305 $mA/cm^2$, 310 $mA/cm^2$, 315 $mA/cm^2$, 320 $mA/cm^2$, 325 $mA/cm^2$, 330 $mA/cm^2$, 335 $mA/cm^2$, 340 $mA/cm^2$, 345 $mA/cm^2$, 350 $mA/cm^2$, 355 $mA/cm^2$, 360 $mA/cm^2$, 365 $mA/cm^2$, or any range of any two endpoints thereof.

As described herein, electrochemical performance of the metal oxide nanocomposites was examined using cyclic voltammetry (CV) and electrochemical impedance spectroscopy (EIS) methods. A KOH medium and a three-electrode system was used. The metal oxide nanocomposites exhibited strong electro-catalytic activity and enhanced urea electrochemical oxidation at various urea doses. It is believed that the assembly of the CMC shell with the metal oxide nanoparticles throughout the synthetic pathways, which improves structural flaws, electro-catalysis, and charge transfer, may be the cause of the superior electrochemical activity of the metal oxide nanocomposites.

The metal oxide nanocomposites can be prepared using a reduction co-precipitation method. In at least one embodiment, the metal oxide nanocomposites can be prepared by a simple precipitation reaction of a metal salt with sodium borohydride. In an embodiment, sodium borohydride can be added to an aqueous metal salt solution including carboxymethyl cellulose (CMC) to obtain the metal oxide nanocomposites in the aqueous solution. The metal oxide nanocomposites can be separated using ultracentrifugation and dried in an oven.

In an embodiment, the nanohybrid electrode can be prepared by providing a glassy carbon electrode and contacting a surface of the glassy carbon electrode with a suspension including at least one metal oxide nanocomposite selected from a nickel oxide nanocomposite, a cobalt oxide nanocomposite, and a nickel oxide and cobalt oxide nanocomposite. In an embodiment, the suspension is an isopropanol suspension.

The present teachings are illustrated by the following examples.

Example 1

Preparation of Metal-Coated Carboxymethyl Cellulose Nanoparticles

Nickel-coated carboxymethyl cellulose (CMC) nanoparticles (Ni@CMC), cobalt-coated carboxymethyl cellulose (CMC) nanoparticles (Co@CMC), and Nickel/Cobalt-coated carboxymethyl cellulose (CMC) nanoparticles (Ni/Co@CMC) were separately prepared via the reduction co-precipitation method. For preparation of Ni/Co@CMC, first 2.37 grams of cobalt chloride was added to 50 ml of distilled water and stirred with a magnetic stirrer for 5 minutes until a red-colored solution was obtained. Then, CMC was added to the solution and the sample was left on the stirrer until the solution became thick. Sodium borohydride was added to the thickened solution until the cobalt was completely reduced and the solution turned black. Then a solution of 2.9 grams of nickel and 50 ml of distilled water was added to the black solution. The sample was left on the magnetic stirrer for about two hours, then filtered and dried in an oven to obtain Ni/Co@CMC.

Example 2

Casting

An electrode was mechanically polished using 600-grit and 1500-grit sandpaper to provide a glassy carbon electrode (GCE) surface. After that, 10 cycles of electrochemical cleaning were performed in 0.1 M of $H_2SO_4$. Then, an isopropanol suspension of Ni@CMC, Co@CMC, and Ni/Co@CMC was created. First, 1.5 ml of isopropanol and 10 mg of Ni@CMC, Co@CMC, and Ni/Co@CMC nanohybrids were combined in a container and sealed. The sealed container was then immersed in a sonication bath for 20 minutes. A drop of 5% Nafion solution was then added, and the container was again submerged in the sonication bath for 10 more minutes. The suspension was now ready for casting onto the GCE surface. A drop of the suspension was applied un the GCE surface and allowed to air dry.

Example 3

Fuel Cell and Electrochemical Characterization

The Ni/Co@CMC nanohybrids were stimulated on fuel cells to test their electrochemical performance using cyclic voltammetry (CV) and electrochemical impedance spectroscopy (EIS) methods. Gamry's Potentiostat/Galvanostat/ZRA device (Gamry Instruments, Warminster, PA) was used to conduct electrochemical investigations such as CV, CA, and EIS experiments. For data fitting and EIS measurements, the Gamry instrument comes with the Echem software package Analyst 6.0 (eDAQ, NSW, Australia). As previously reported, the electrochemical tests were done utilizing the standard three-electrode setup at 25° C. and the common GCE deposition of the newly introduced Ni/Co@CMC. As counter and reference electrodes, Pt-sheet and Ag/AgCl/KCl(sat.) were used, respectively. All cyclic voltammetry results were recorded between −0.2 and 0.6 volts. The frequency range of the EIS testing was 100 Hz to 0.1 Hz.

Example 4

Materials Characterization

FIG. 1 displays the XRD pattern for the Co/Ni-CMC nanoparticles. The peaks at 16 and 20.9 demonstrate that its crystalline structure is cellulose II. In addition to the cellulose II peak, the sample also shows separate peaks at 2θ=45.5° and 55.5°, which are typical metallic Co nanoparticles face-centered cubic phase peaks. This indicates that Co nanoparticles were thoroughly crystallized onto the amorphous CMC matrix with an average particle size of 18 nm estimated using the Scherrer formula. The sample shows an amorphous nature due to the ambient conditions of the synthesis procedure.

Figure 3A:
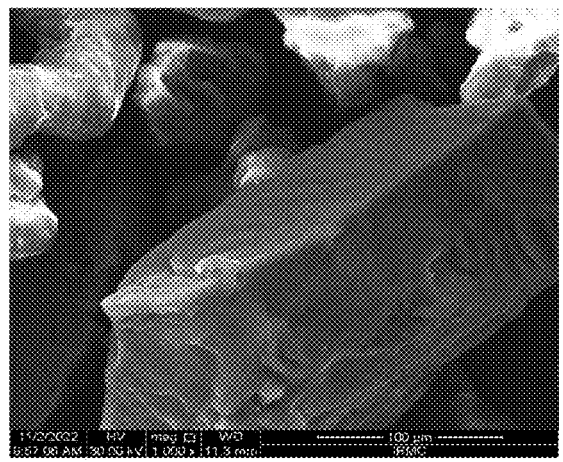
FIGS. 3A-3C are emission scanning electron microscopy (SEM) images of FIG. (3A) Ni@CMC.
Figure 3B:
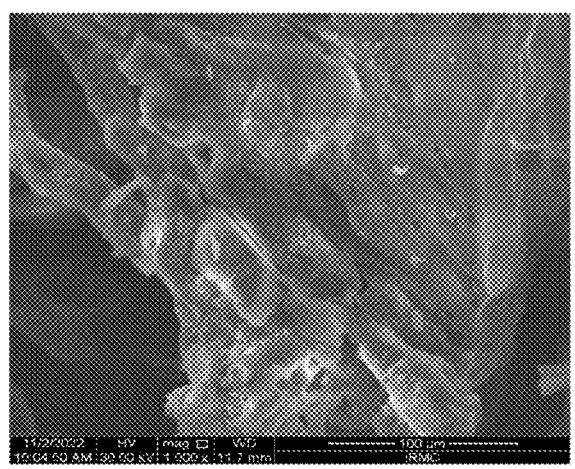
Figure 3C:
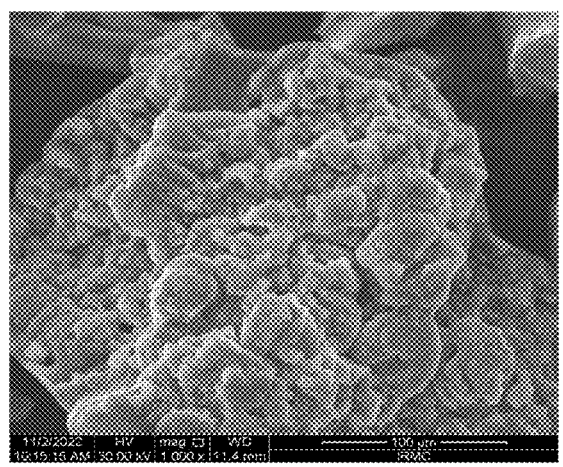

FIGS. 2A-3C show SEM micrographs of (FIGS. 2A and 3A) Ni@CMC; (FIGS. 2B and 3B) Co@CMC; and (FIGS. 2C and 3C) Ni—Co@CMC. FIG. 2A and FIG. 3A depict micrographs of a Ni@CMC nanocomposite at 5 μm magnification and 10 μm magnification, respectively. With respect to Ni@CMC, it can be seen that the CMC surface is completely covered with highly distributed clustered grains with an average size of 55 nm. FIGS. 2B and 3B depict micrographs of a Co@CMC nanocomposite at 5 μm magnification and 10 μm magnification, respectively. With respect to Co@CMC, a high distribution of Co NPs can be seen on the surface of CMC, without agglomeration, a regular cubic shape, an average diameter of 60 nm and a length of 150-170 nm. FIGS. 2C and 3C depict micrographs of a Ni/Co@CMC nanocomposite at 5 μm magnification and 10 μm magnification, respectively. A good distribution of rounded Ni over Co@CMC thin grains with a soft or rough surface structure can be seen.

Example 5

Electrooxidation of Urea

Figure 4:
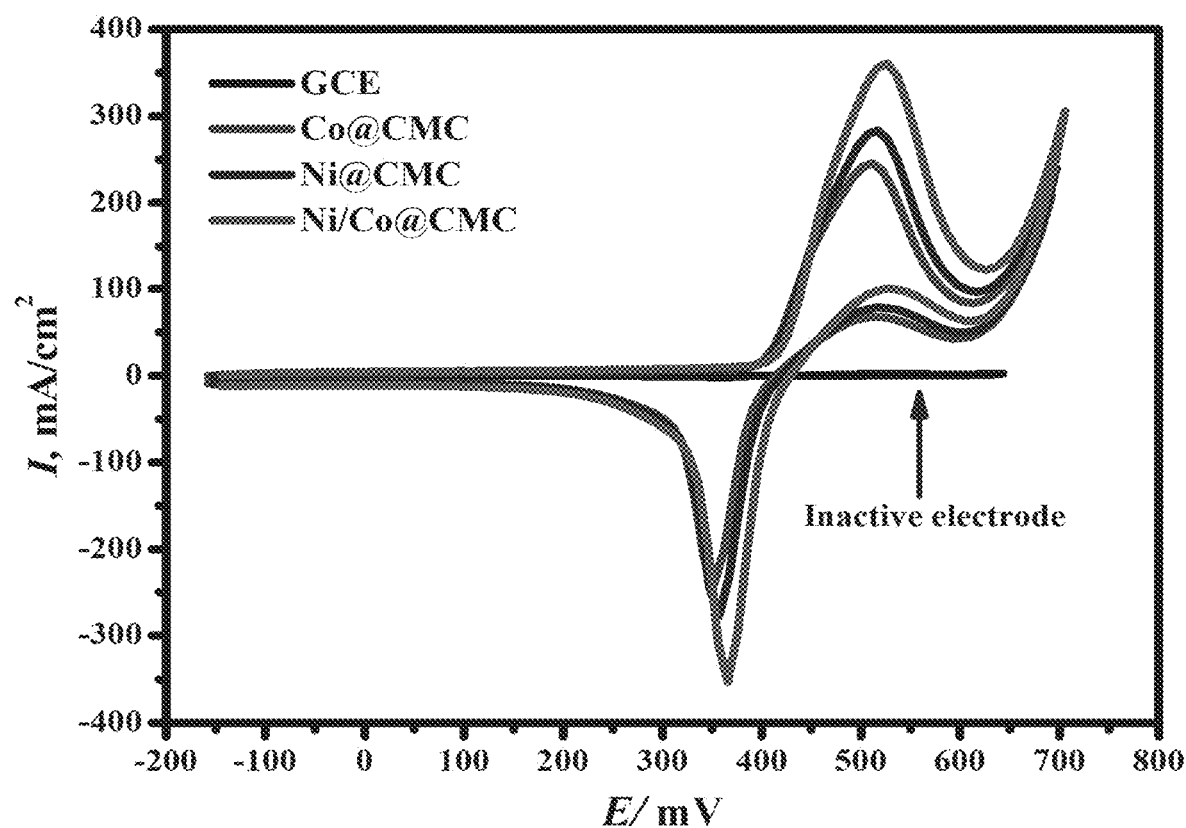
FIG. 4 depicts the cyclic voltammetry (CV) of the pristine GCE, the GCE modified with Co@CMC, the GCE modified with Ni@CMC, and the GCE modified with Ni/Co@CMC in 1.0 M KOH medium and 1.5 M urea with loading 0.1 mg/cm$^2$ catalyst at scan rate 100 mV.

The prepared Co@CMC, Ni@CMC, and Ni/Co@CMC modified electrodes were tested for the electrochemical oxidation of urea in a high pH value (1.0 M KOH). The compositions of Co@CMC, Ni@CMC, and Ni/Co@CMC were examined via CV analysis as shown in FIG. 4. Because there are no anodic peaks seen in the case of pristine GCE electrode, the electrode exhibits a passive performance when it comes to the electrochemical oxidation of urea. The lack of Ni-nanoparticles may be the cause of the surface's inactivity because no NiOH can develop without them, making the surface electrochemically inactive. Electroactivity was ongoing for Co@CMC, Ni@CMC, and Ni/Co@CMC modified electrodes. The anodic branch was where the electrochemical oxidation was first noticed, which began at 0.3548 V. The maximum current densities obtained by Co@CMC and Ni@CMC are 240.1 and 280.3 mA/cm$^2$, respectively. This is significantly less than the current density produced by the composite material of Ni/Co@CMC, which was 363.1 mA/cm$^{-2}$. The obtained high current density in the presence of 1.5 M urea demonstrates that the Ni/Co@CMC material was a more efficient electrochemical catalyst for urea oxidation compared with Co@CMC and Ni@CMC. These results demonstrate that the Ni/Co@CMC material has excellent electrocatalytic efficiency for urea electrooxidation. Accordingly, the Ni/Co@CMC nanocomposite can be used for fabrication of electrodes in UFCs.

Example 6

EIS Studies

Figure 5:
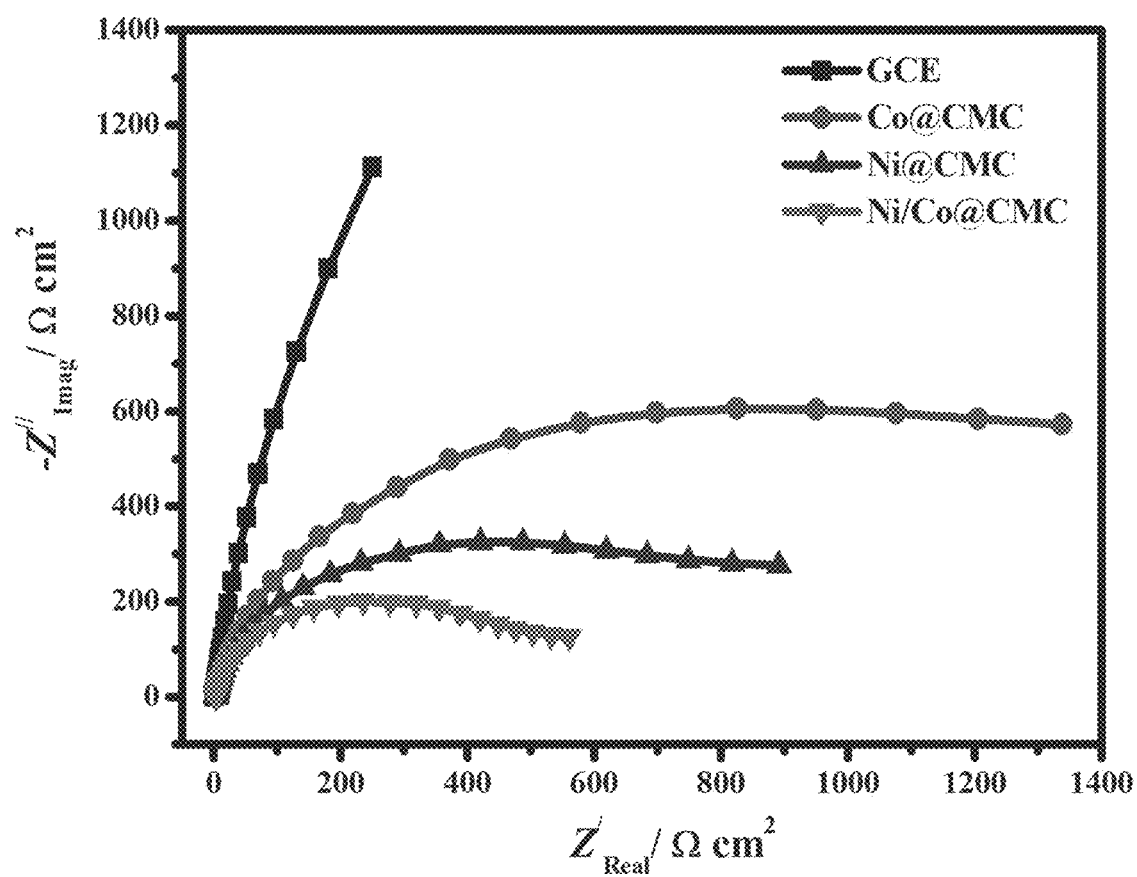
FIG. 5 is a Nyquist plot of the pristine GCE, the GCE modified with Co@CMC, the GCE modified with Ni@CMC, and the GCE modified with Ni/Co@CMC in 1.0 M KOH medium and 1.5 M urea with loading 0.1 mg/cm$^2$ catalyst.

FIG. 5 displays the results of impedance spectroscopy (EIS) tests conducted on the synthesized Co@CMC, Ni@CMC, and Ni/Co@CMC materials in the presence of 1.5 M urea in aqueous KOH. The Nyquist diagram for the clean or unmodified GCE has a line character without any semi-circles, suggesting a reduced transfer mechanism in electrolytes. A semicircle was clearly visible for the GCE modified with Co@CMC, Ni@CMC, and Ni/Co@CMC nanocomposites in 1.5 M urea, demonstrating the existence of a new charge transfer method of urea electrooxidation. Three resistances were present in the electrochemical cell under investigation: one for the electrolyte, one for the $Ni^{2+}/Ni^{3+}$ reaction, and one for the urea oxidation that produces nitrogen and $CO_2$, which produces six electrons. The third process was present only in the presence of urea which interpreted the existence of semicircles in all Co@CMC, Ni@CMC, and Ni/Co@CMC electrodes. The decrease in the polarization resistance after altering the electrode material from Co@CMC, Ni@CMC to Ni/Co@CMC designates improved interaction between the electrolyte and the electrode in the case of Ni/Co@CMC compared to the Co@CMC, Ni@CMC electrodes, which confirms the enhanced electron transfer for the Ni/Co@CMC electrode.

It is to be understood that the metal oxide nanocomposites are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A metal oxide nanocomposite comprising metal oxide nanoparticles distributed over a carboxymethyl cellulose shell, wherein the metal oxide nanoparticles comprise at least one metal oxide nanoparticle selected from nickel oxide nanoparticles having an average size ranging from about 50 nm to about 60 nm and cobalt oxide nanoparticles.

2. The metal oxide nanocomposite according to claim 1, wherein the cobalt oxide nanoparticles have an average diameter ranging from about 55 nm to about 65 nm and an average length ranging from about 150 nm to about 170 nm.

3. The metal oxide nanocomposite according to claim 1, wherein the metal oxide nanoparticles comprise nickel oxide nanoparticles and cobalt oxide nanoparticles.

4. A nanohybrid electrode, comprising:
a working electrode modified with at least one metal oxide nanocomposite, the at least one metal oxide nanocomposite comprising metal oxide nanoparticles distributed over a carboxymethyl cellulose shell, wherein the metal oxide nanoparticles comprise at least one metal oxide nanoparticle selected from nickel oxide nanoparticles having an average size ranging from about 50 nm to about 60 nm and cobalt oxide nanoparticles.

5. The nanohybrid electrode according to claim 4, wherein the cobalt oxide nanoparticles have an average diameter ranging from about 55 nm to about 65 nm and an average length ranging from about 150 nm to about 170 nm.

6. The nanohybrid electrode according to claim 4, wherein the metal oxide nanoparticles comprise nickel oxide nanoparticles and cobalt oxide nanoparticles.

7. The nanohybrid electrode according to claim 4, wherein the working electrode is a glassy carbon electrode.

* * * * *